UNITED STATES PATENT OFFICE.

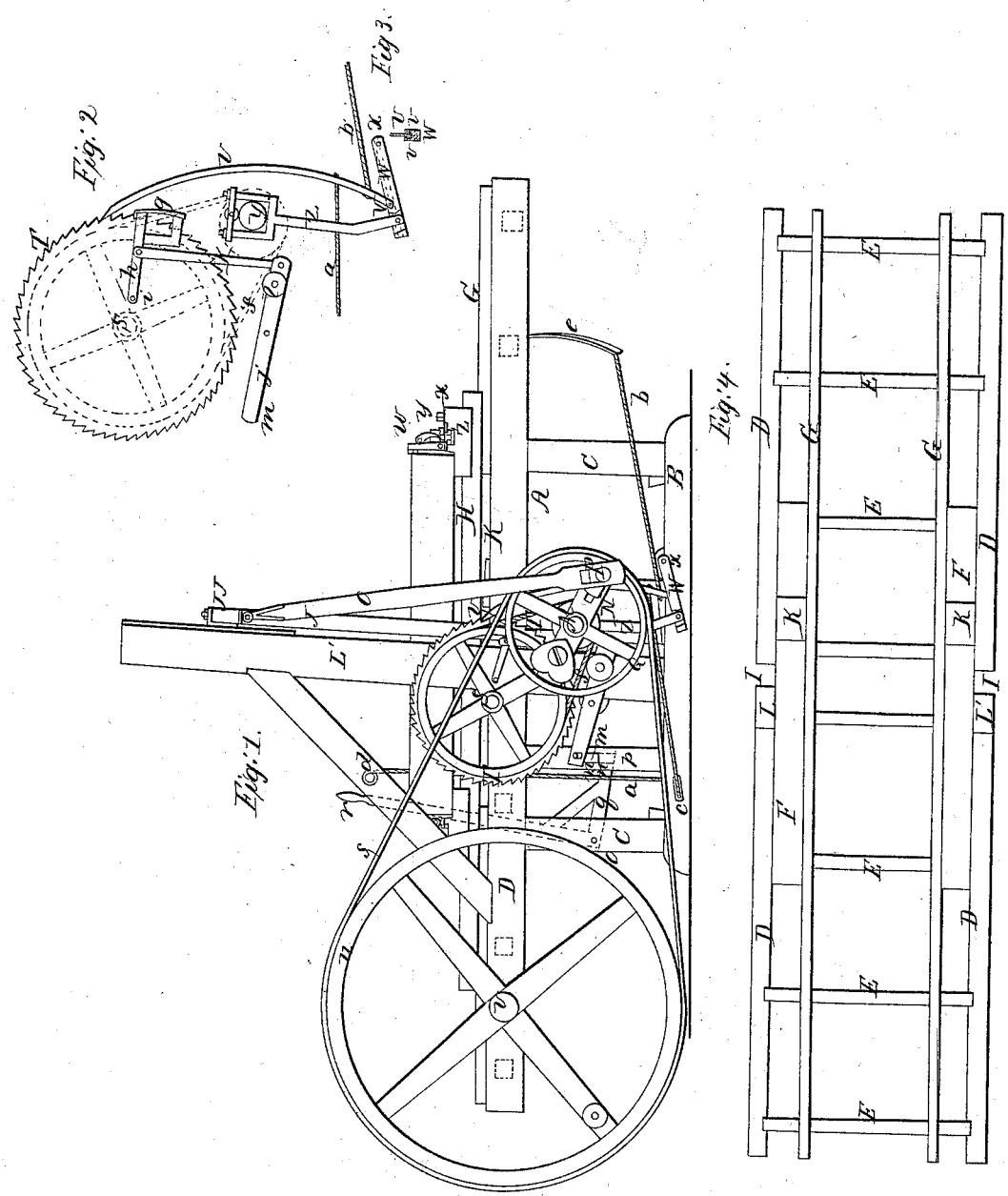

PEARSON CROSBY, OF FREDONIA, NEW YORK.

PORTABLE SAWMILL.

Specification of Letters Patent No. 2,804, dated October 7, 1842.

*To all whom it may concern:*

Be it known that I, PEARSON CROSBY, of Fredonia, Chautauqua county, and State of New York, have invented new and useful Improvements in my Patented Sawmills, which are described as follows, reference being had to the annexed drawings of the same, making part of this specification.

Figure 1, is a side elevation of the machine. Fig. 2 is a vertical section of the feeding apparatus; Fig. 3, cross section of the reciprocating lever; Fig. 4, top view of the frame.

Similar letters refer to corresponding parts.

The principal improvements desired to be patented are in the manner of constructing the frame by which it is rendered more portable, less expensive, and more permanent and in the apparatus for regulating the feeding and for throwing the said apparatus in and out of gear; likewise in the construction of the dogs for securing the logs.

The frame A is composed of longitudinal sills B transverse sills mortised and tenoned into the same posts C, on the heads of which posts, are mortised and tenoned longitudinal parallel timbers D divided near the middle in the manner and for the purposes to be hereafter described, connected by cross timbers, E and spliced by longitudinal parallel timbers F; on the transverse timbers E are placed the parallel ways G for the carriage H to slide on. The aforesaid divided horizontal timbers D are placed sufficiently far apart to form spaces I to admit the fender posts, and also to allow the saw gate J to move freely therein in front of the fender posts. The timbers F which splice the divided timbers D are placed against the sides of said divided timbers next the saw and are notched to the cross timbers, and are held firmly by the ways having permanent blocks K on the top of said splicing timbers for stopping the carriage and preventing the head block striking the saw.

In order to bring the log or timber to be sawed as near the ground as possible and at the same time give the saw its requisite sweep the lower part of the saw gate and saw are made to pass back of the crank shaft, and to prevent the unequal rake of the pitman the head of the fender posts are thrown forward and to accomplish this object the fender posts L are made to stand in an inclined position on the sills for the purpose of bringing the cross head of the saw gate perpendicularly over the center of the fly wheel or crank shaft when the crank is in a horizontal position.

The crank shaft or fly wheel shaft M is placed horizontally and transversely below the divided timbers D and in front of the inclined fender posts L turning in suitable boxes in short posts N mortised and tenoned into the sills B and in the under sides of the divided timbers D.

The cross heads J J of the saw gate J extends beyond the sides thereof sufficiently far to receive the joints of the upper ends of the pitman rods $o$ whose lower ends are attached to the wrist P of the cranks or fly wheels $a$ outside the frame A.

The shaft S of the rag wheel T turns in a suitable box directly behind the fender post L′ next to the said rag wheel.

The feeding hand U is a curved piece of iron tapered at the end in contact with the teeth of the rag wheel T and made with two shoulders or ears V V at the lower end one on each side thereof, which shoulders move in a groove formed by two plates grooved or channeled on the sides next each other and riveted together, which plates, when united form what is termed a reciprocating latch or lever and is marked W in Figs. 1, 2, 3. It is made to move on a stud or pin X passed through into the frame. This reciprocating lever gives the requisite sweep to the hand and of course the required feed. It receives its motion from an eccentric wheel Y on the crank shaft M around which is passed a stirrup Z leading to the extremity of the reciprocating lever W.

The degree of sweep of the feeding hand is regulated by the position of its shoulders V in the groove of the reciprocating lever W, and this position is effected by means of cords $a$ $b$ attached to the feeding hand U, one of which cords is for drawing the hand toward the outer extremity of the reciprocating lever and of course increasing the sweep of the hand, and passes through a slot in the stirrup Z and around a pulley $c$ in the sill B, and under another pulley in one of the transverse sills of the frame and up to a windlass $d$ on the opposite side of the machine. The other cord $b$ is attached to the front of the hand U leading back to a spring $e$ fastened to the frame A in any convenient position. When the cord $a$ leading to the windlass is slackened the spring $e$ draws back the cord $b$ and hand U and of course decreases its sweep by drawing its lower extremity nearer to the fulcrum $x$ of the reciprocating lever W. The cord $a$ leading to the windlass also keeps the hand U in gear with the rag wheel T.

The apparatus for throwing the feeding hand U out of gear with the rag wheel and simultaneously to tighten the band $f$ for running back the carriage is combined and arranged in the following manner. A curved plate $g$ is attached to the outer extremity of a lever $h$ turning on a pin $i$ inserted into the side of the frame A which plate comes under the hand U and lifts it from the rag wheel T. This lever $h$ is connected to the end of a vibrating bar $j$ by a connecting rod $k$, to which end of the bar is attached a tightening pulley $l$ which, when the curved plate is lifted to raise the hand, simultaneously raises the pulley $l$ against the band $f$ for running back the carriage, tightens it and causes the feed or rag wheel T to reverse its motion. The vibrating bar $j$ is moved and simultaneously with it the lever $h$ by means of a transverse lever $m$ attached to the other extremity of the vibrating bar $j$ and moving on a fulcrum $n$ in a post $p$ near the middle of the frame A its opposite end being connected to an elbow lever $q$ moving on a horizontal pin $o$ as its fulcrum, passed through the angle of said lever into one of the side posts of the frame on the opposite side thereof, and rising above the top thereof and formed into a handle $r$ for the operator to lay hold of.

The power to operate the machine which may be of any convenient kind is applied by a band $s$ passed around a pulley $t$ formed on the fly wheel and around a driving wheel $u$ placed on a transverse shaft $v$ turning in boxes in the parallel timbers D of the frame A near the end thereof.

The dogs $w$ for securing the log are attached to slides $x$ moving in grooves in the head and tail blocks, through which slides vertical screws $y$ with square heads are passed, screwed into nuts $z$, which slide under the parallel plates of the head and tail blocks. These screws are turned by a wrench when the slides are required to be removed.

The slides with the dog and log are moved transversely toward the saw as the boards are cut, by a mill bar resting against pins inserted into the head and tail blocks as a fulcrum the short end of the mill bar bearing against the slide and the operator having hold of the long end of it.

A half bale dog is set in a slide, similarly constructed which is used as a gage for determining the thickness of the boards to be cut, the log being brought against said gage dog by means of the lever or mill bar previous to the advance of the carriage toward the saw in which position it is held firmly by the dogs connected to the slides. The said slides being secured to the plates of the head and tail blocks by the aforesaid screws and nuts. The screws are turned by a lever having a square opening corresponding with the heads of the screws.

I am aware that the fender posts and gate of saw mills have been placed at an inclination to make the line of motion of the gate greater or less than 90 degrees with the bed of the carriage and this I do not therefore claim as my invention but What I do claim as my invention and desire to secure by Letters Patent is—

Arranging the fender posts and gate at an inclination as described in combination with the location of the crank shaft and pitman rods, the former being placed in front of the gate, and the latter being connected with the gate near the top thereof so that the gate in working shall pass by the crank shaft instead of working entirely above it, and that part of the gate to which the pitman rods are attached, is in a vertical line, or nearly so, over the shaft, all as described.

PEARSON CROSBY.

Witnesses:
 WM. P. ELLIOT,
 E. MAHER.